US 6,705,787 B2

(12) United States Patent
Jeffries et al.

(10) Patent No.: US 6,705,787 B2
(45) Date of Patent: Mar. 16, 2004

(54) PROTECTIVE KEYBOARD COVER

(75) Inventors: Deidra B. Jeffries, Valencia, CA (US); Claudia D. Nichol, Agoura Hills, CA (US); Sandra B. Brazier, Agoura Hills, CA (US)

(73) Assignee: Speedskin LLC, Agoura, CA (US)

( * ) Notice: Subject to any disclaimer, the term of this patent is extended or adjusted under 35 U.S.C. 154(b) by 45 days.

(21) Appl. No.: 09/897,216

(22) Filed: Jul. 2, 2001

(65) Prior Publication Data

US 2003/0002909 A1 Jan. 2, 2003

(51) Int. Cl.[7] ................................................ B41J 29/13
(52) U.S. Cl. ........................ 400/714; 400/496; 434/227; 235/145 R; 312/208.3
(58) Field of Search ................................ 400/713, 714, 400/472, 496, 691; 434/227, 229; 235/145 R; 312/208.1, 208.3, 208.4; 206/305, 320; 200/302.1, 302.2, 304; 150/154, 165

(56) References Cited

U.S. PATENT DOCUMENTS

| 5,021,638 | A | | 6/1991 | Nopper et al. .......... 235/145 R |
| 5,096,317 | A | | 3/1992 | Phillippe .................... 400/714 |
| 5,197,178 | A | * | 3/1993 | Lichte et al. ................ 206/305 |
| D353,369 | S | * | 12/1994 | Leibengood ................ D14/455 |
| 5,733,023 | A | * | 3/1998 | Lee .......................... 312/208.3 |
| 6,050,825 | A | | 4/2000 | Nichol et al. ................ 434/227 |
| D425,041 | S | * | 5/2000 | de Taboada ................ D14/455 |
| 2002/0051957 | A1 | * | 5/2002 | Schwarzkopf .............. 434/227 |

FOREIGN PATENT DOCUMENTS

| GB | 2 152 437 A | * | 8/1985 |
| GB | 2 201 922 A | * | 9/1988 |
| JP | 9-81292 | * | 3/1997 |
| WO | WO 94/00809 | * | 1/1994 |

* cited by examiner

Primary Examiner—Leslie J. Evanisko
(74) Attorney, Agent, or Firm—Aaron T. Borrowman; Kelly Bauersfeld; Lowry & Kelley, LLP

(57) ABSTRACT

A shield for protecting a keyboard assembly includes a one-piece resiliently flexible membrane having a generally planar base overlaying a deck portion of the keyboard assembly, and one or more raised bubbles formed in the membrane and configured to envelope an entire key array or separate or combined key clusters of the keyboard assembly. In a particularly preferred form, a raised bubble enveloping an alpha-numeric and format/command key cluster includes grooves configured to surround and form-fit only alphabetical, numeric, punctuation and symbol keys of the cluster. Thus, a shield adapted for use on the keyboard assembly selected from numerous keyboard assemblies having different key configurations is attained.

18 Claims, 4 Drawing Sheets

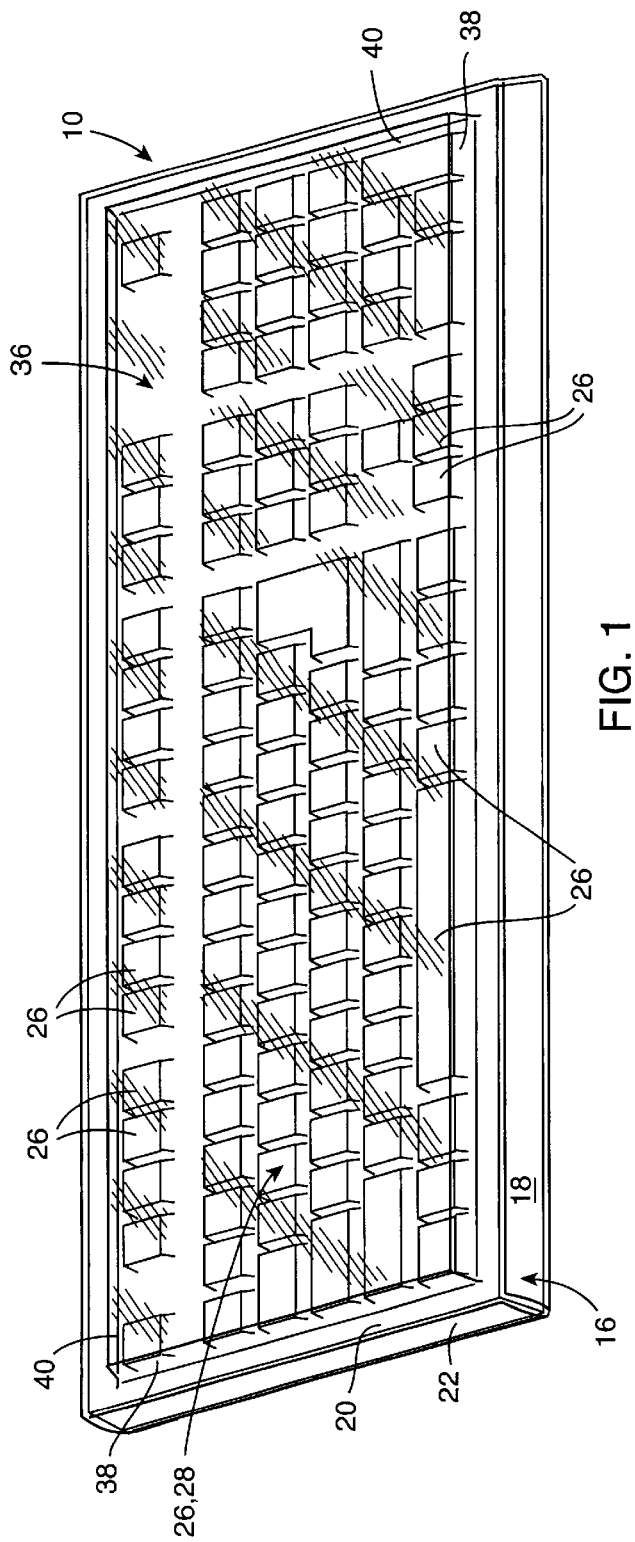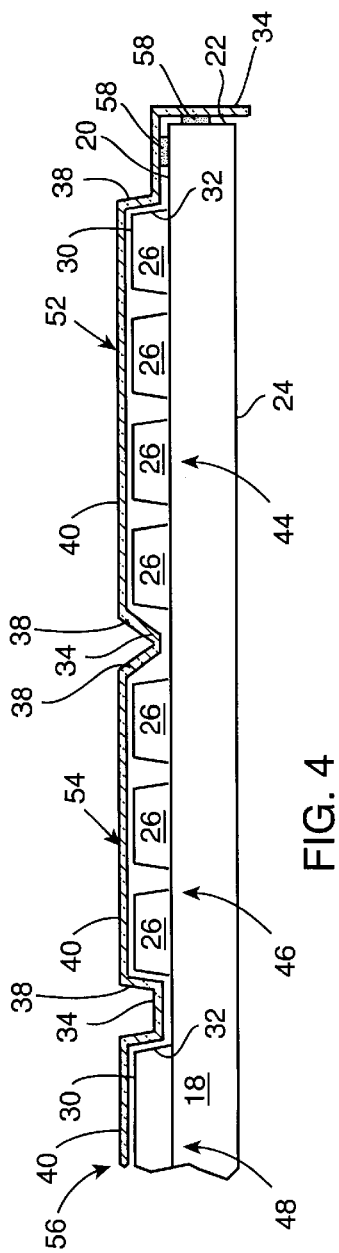
FIG. 1
FIG. 4

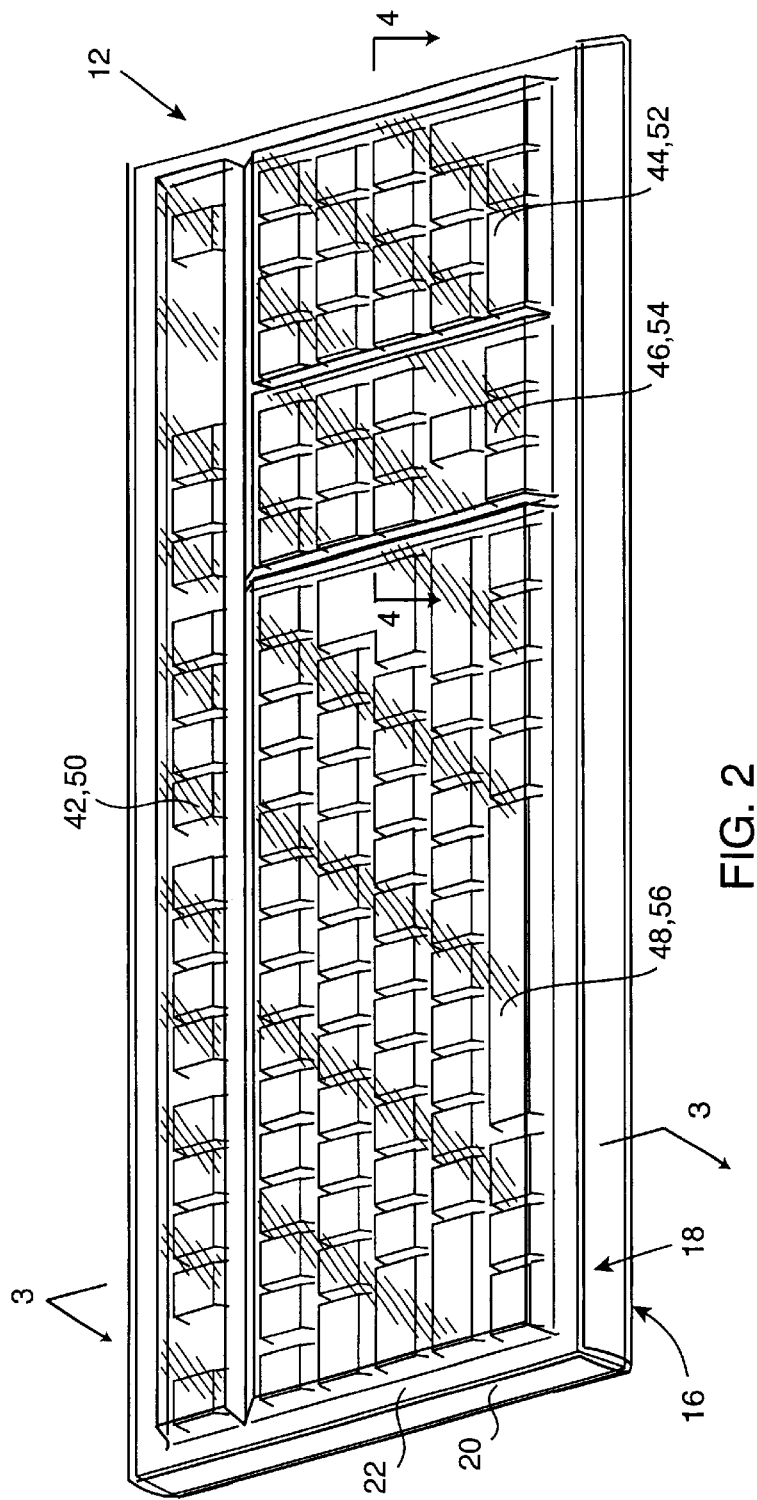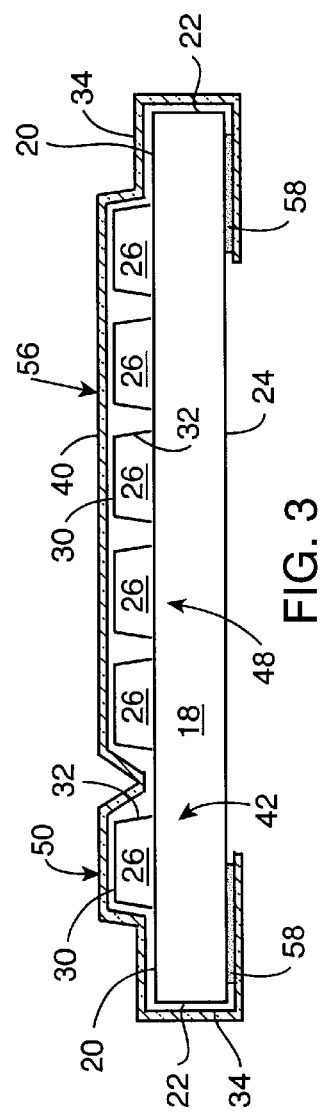

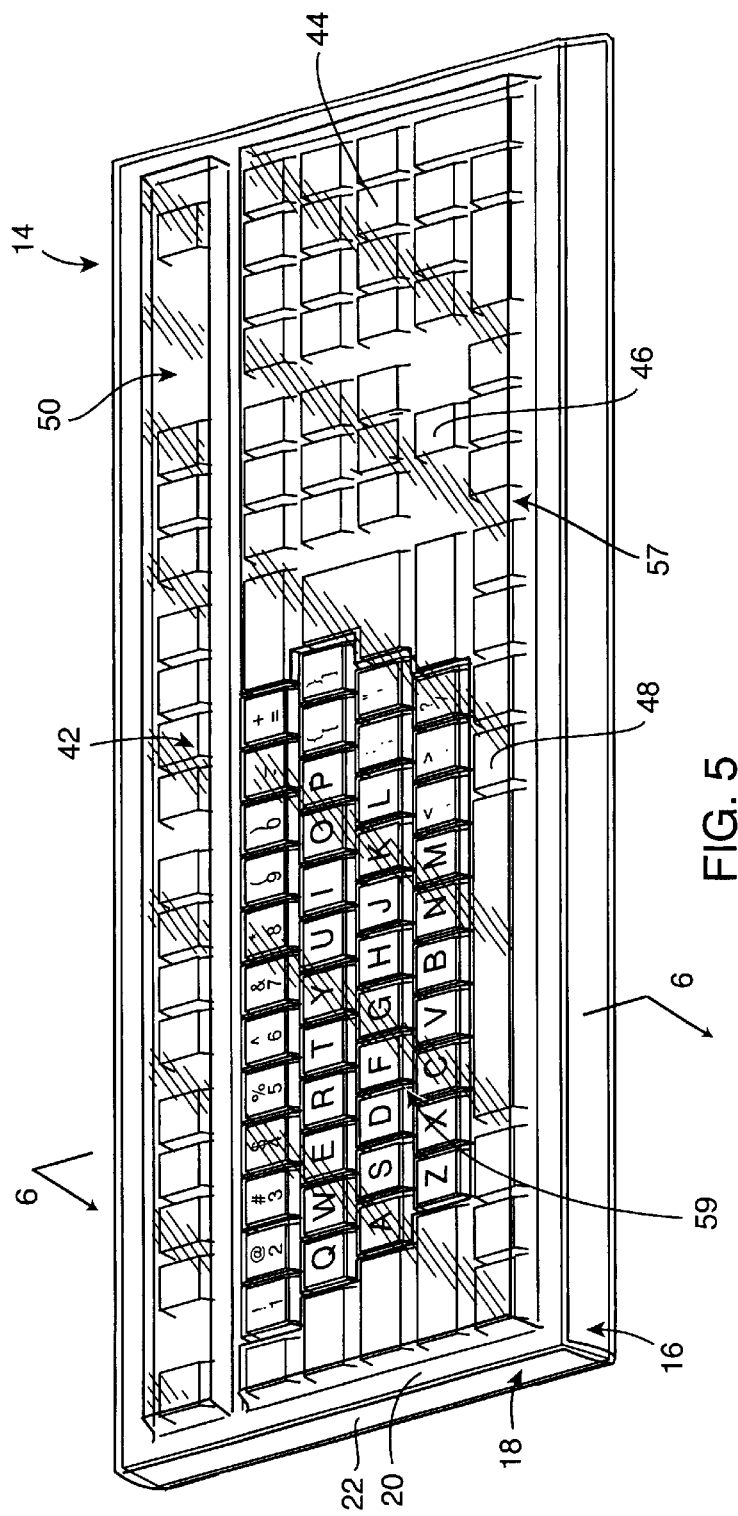
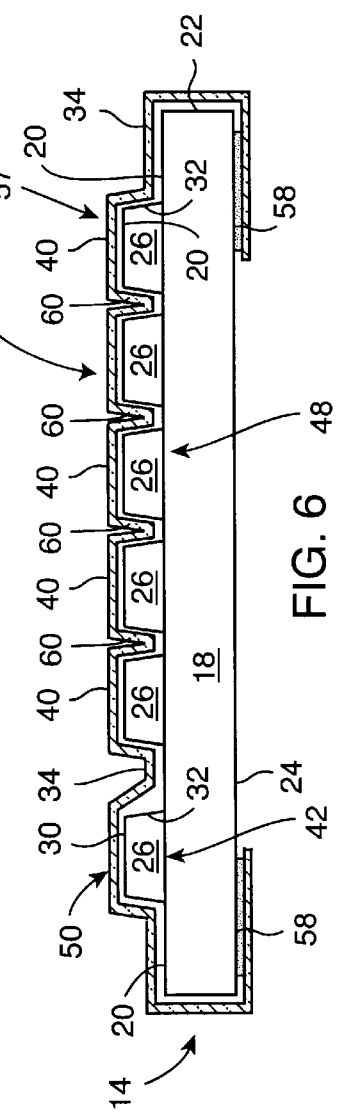
FIG. 5
FIG. 6

PROTECTIVE KEYBOARD COVER

BACKGROUND OF THE INVENTION

The present invention relates generally to protective keyboard covers. More particularly, the present invention relates to a protective shield adapted for use on any commercially available keyboard assembly selected from numerous keyboard assemblies having different key configurations.

Keyboards are an integral part of many machines such as word processing devices, personal computers and the like. Keyboards include a series or array of keys which are movable through a deck portion of the keyboard in order to generate an electrical or mechanical signal by movement of one or more keys. However, the presence of passages in the deck portion in the vicinity of the movable keys permits access of various contaminants such as water, dust and the like into the interior of the keyboard. The entry of such contaminants effects the internal operation resulting in malfunction of the keyboard and the expense of its replacement. Thus, there have been devised keyboard covers which prevent the entry of contaminants into the interior of the keyboard, especially in those passages between the keys and the deck of the keyboard.

There have been devised keyboard overlays or "masks" which are typically opaque and act to provide a translation device or to facilitate keyboard memorization. One such device is disclosed in U.S. Pat. No. 6,050,825 to Nichol et al. However, such masks typically only cover a portion of the keyboard and are not very effective in preventing nor are they intended to prevent contaminants from entering the interior of the keyboard.

Yet other prior-art keyboard covers are made to cover the entire keyboard frame and include grooves molded to form-fit the four sides of all individual keys of the keyboard. Exemplary devices are the subject of U.S. Pat. No. 5,021,638 to Nopper et al., and U.S. Pat. No. 5,096,317 to Phillippe. However, the display of keyboards vary from device to device. For example, the "enter" key may be rectangular in shape on certain keyboards, and a backwards "L" shape in others. Other format keys including the "caps lock", "shift", "control", "alt", "space bar" "tab", and "backspace" keys also vary from keyboard to keyboard. Although function keys typically are aligned along a top portion of the keyboard, the relative size and position of these keys can vary from keyboard to keyboard. Directional arrow or cursor keys, defined for purposes in this application as those keys having arrows thereon capable of moving the cursor up, down or side to side, as well as the "insert", "home", "page up", "delete", "end" and "page down" also vary in size and position from keyboard to keyboard. Although many keyboards include a 10-key pad, which is often fairly universal in nature, this cluster of keys is spaced from the other clusters to differing degrees from keyboard to keyboard.

Thus, while keyboard covers such as that of Nopper et al., and others provide the "touch" or "feel" of the keyboard, the result is that there are over 3,000 different keyboard covers. This is because each keyboard manufacturer uses different dimensions and spacing for the format, function keys, etc. of its brand/model of keyboard. Manufacturers of such keyboard covers must necessarily keep in stock nearly 3,000 different keyboard models with which the specific keyboard cover can be produced by thermoformed over vacuum-molded plastic processing.

When purchasing, to assure proper fit of a prior-art keyboard cover, a consumer must order the cover by brand name and model or serial number. This is a rather lengthy and time-consuming process as the consumer must determine and inventory the model/serial number of each keyboard, locate the specific cover in a catalog/price list, compute the purchase amount, order the cover, pre-pay for the order, and then often wait weeks to receive the order. Those keyboard covers which do not produce high-volume orders must be manufactured as a low-volume custom order, increasing the cost of the cover. Some companies which have manufactured custom covers based on brand name/model number variations have discontinued manufacturing certain model numbers as the demand has been insufficient to merit maintaining its production capabilities. This leaves certain consumers without the option of adequately protecting the keyboard from environmental contaminants.

Accordingly, there is a need for a keyboard cover or shield which is capable of being utilized on any commercially available keyboard, and capable of being manufactured in high volume, thus decreasing the cost to the consumer. Such a cover should prevent contaminants from entering into the interior of the keyboard, especially in those passages between the keys and deck of the keyboard while preserving the "touch" or "feel" of the individual keys of the keyboard typically used. The present invention fulfills these needs and provides other related advantages.

SUMMARY OF THE INVENTION

The present invention resides in a shield for protecting a keyboard assembly. The typical keyboard assembly has a plurality of keys defining a key array having an outer periphery defined by side walls of outer keys of the array. The keys of the keyboard are grouped into a plurality of key clusters. A deck portion of the keyboard assembly surrounds each key cluster and the key array.

The shield of the present invention generally comprises a one-piece resiliently flexible membrane having a generally planar base overlaying the deck portion of the keyboard assembly. In one form, a raised bubble is formed in the membrane and configured to envelope the key array. The bubble is defined by a raised wall approximating the height of the side walls of the keys defining the outer periphery of the key array, and is positioned immediately adjacent to the side wall so as to encircle the outer periphery of the key array. A generally planar cover extends from the raised wall and overlays top surfaces of the enclosed keys. Preferably, the membrane is transparent or translucent so as to enable the user to see the keys under the keyboard shield. However, the membrane may be opaque to facilitate keyboard memorization. An outer edge of the base is attached to the deck portion of the keyboard assembly, side walls of the keyboard assembly, or an obverse side of the keyboard assembly to hold the membrane in place.

In another form, the raised wall encircles keys comprising an outer periphery of a cluster of keys to define a raised bubble enveloping one or more clusters of keys. Such cluster of keys comprises a function-key cluster, an alpha-numeric and command/format key cluster, a directional arrow or cursor key cluster, a 10-key pad key cluster or a combination of clusters. Preferably, multiple raised bubbles are formed, each raised bubble enveloping an individual or combined cluster of keys. In such an embodiment, the base overlays deck portions of the keyboard assembly between the keyboard clusters.

In a particularly preferred embodiment of the present invention, the raised bubble enveloping the alpha-numeric and command/format key cluster includes grooves configured to surround and form-fit the alphabetical, numerical, and punctuation keys of the cluster. These keys have been found to be "universal" amongst the numerous keyboard assemblies having different key configurations. Thus, bubbles are formed around clusters of keys, while the alphabetical, numerical and punctuation keys common amongst all keyboard assemblies are form-fitted so that a one-size-fits-all cover having the "touch" and "feel" of the individual keys commonly used in the keyboard is attained.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a keyboard with a protective shield having a single bubble overlying keys of the keyboard.

FIG. 2 is a perspective view of a keyboard with a protective shield having multiple bubbles overlying key clusters of the keyboard.

FIG. 3 is a cross-sectional view taken generally along line 3—3 of FIG. 2, illustrating the coverage of the bubbles and attachment of the shield to the keyboard.

FIG. 4 is a cross-sectional view taken generally along line 4—4 of FIG. 2, and illustrating configurations and coverage by two bubbles of the shield in this embodiment.

FIG. 5 is a perspective view of a keyboard having a protective shield embodying the present invention overlying a top surface of the keyboard and having multiple bubbles overlying key clusters, as well as a form-fitted alpha-numeric section;

FIG. 6 is a cross-sectional view taken generally along line 6—6 of FIG. 5, and illustrating the form-fitted section of the alpha-numeric bubble.

DETAILED DESCRIPTION OF THE PREFERRED EMBODIMENTS

Figure 7:
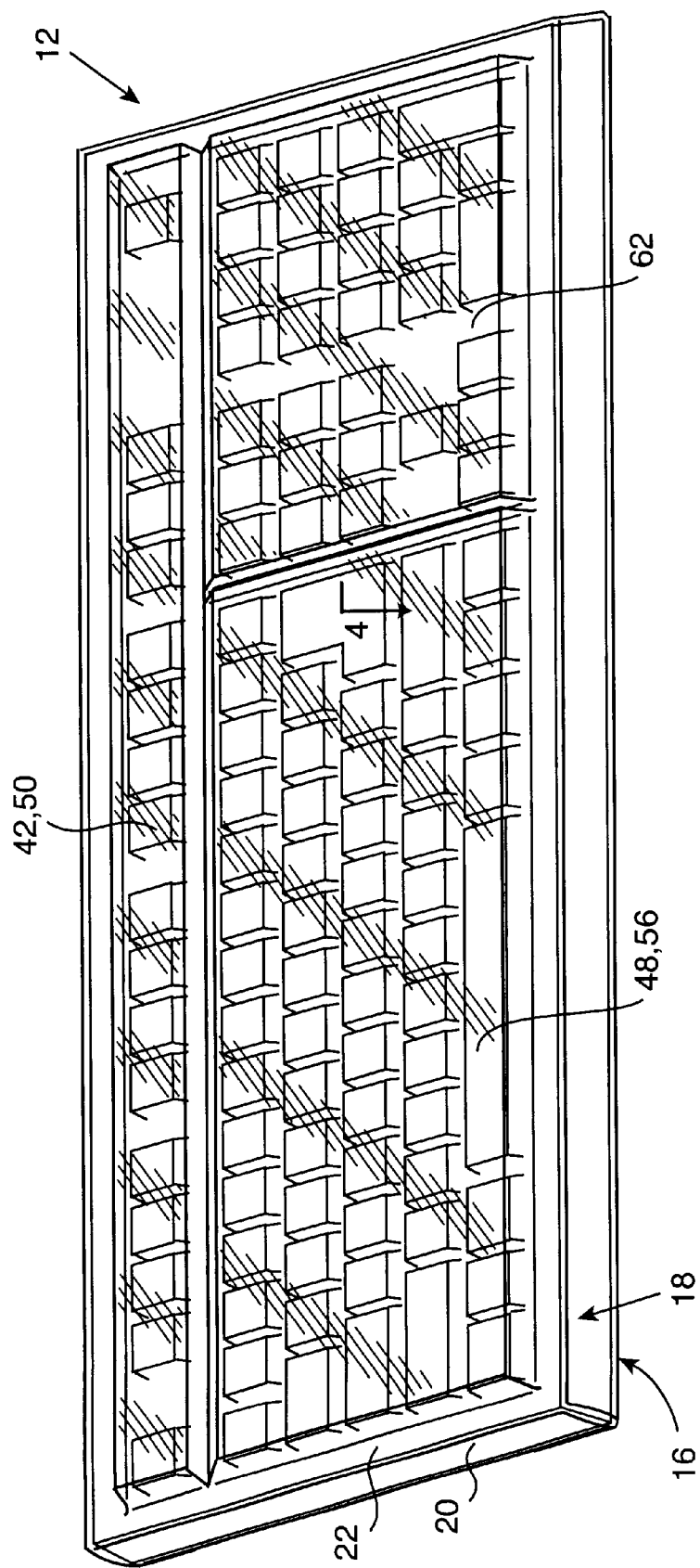
FIG. 7 is a perspective view of a keyboard having a protective shield embodying the present invention overlying a top surface of the keyboard and having multiple bubbles overlying key clusters.

As shown in the drawings for purposes of illustration, the present invention is concerned with a protective shield, generally referred to in FIG. 1 by the reference number 10, in FIGS. 2–4 by the reference number 12, and in FIGS. 5–6 by the reference number 14. The shield 10, 12, 14 is designed to overly a top face of a keyboard assembly 16 to prevent the entry of particles, liquids and other contaminants within the keyboard assembly 16, while providing the natural feel of the keys to the greatest extent possible and being universal in nature so that it can be applied to any commercially available keyboard.

Keyboard assemblies 16 are well known in the art and have become an integral part of many machines including word processing devices and computers. Such keyboard assemblies 16 include a rigid frame 18 defining a top deck 20, side walls 22, and a rear or obverse face 24 of the keyboard assembly 16. The keyboard assembly 16 also includes a plurality of keys 26 which are generally formed into rows and columns having a predetermined configuration and collectively forming a two-dimensional array 28. Each key 26 of the array 28 extends through the deck 20 of the frame 18 and by depression operate, either electronically or mechanically, through intervening means (not shown), so as to generate a signal to the device with which the keyboard assembly 16 is associated. The various keys 26 may be of varying size, but all keys 26 generally include a relatively planar top surface 30 and side walls 32 which extend from the top surface toward the frame deck 20. The side walls 32 generally have a small degree of taper, as illustrated in the drawings. It will be appreciated that there exist openings between the frame deck 20 and the individual keys 26 so that the keys 26 can be depressed into the frame 18 to generate the appropriate signal. As described above, a common problem with keyboard assemblies 16 is that liquids, particles and other contaminants enter through these openings and adversely affect the typically electronic intervening means within the keyboard.

With reference to FIG. 1, a protective shield 10 embodying the present invention is illustrated which is comprised of a one-piece resiliently flexible membrane, such as polyurethane, plastic or rubber material, which is transparent or translucent so as to enable a user of the shield 10 to view the keys 26 through the shield 10. Alternatively, the shield 10 can be opaque to facilitate keyboard memorization. The shield 10 is manufactured using conventional thermoforming, vacuum molding, or any other suitable method of molding and formation. The shield 10 includes a generally planar base 34 which overlays the deck portion 20 of the keyboard assembly 16. Although the planar base 34 is shown in the drawings as attached to an obverse face 24 of the keyboard assembly 16 in the various Figures, it should be understood by the reader that the planar base 34 may be attached directly to the deck 20, frame sidewalls 22, or obverse face 24 by hook and loop tape, adhesive, or any other suitable means to hold the shield 10 in place on the keyboard assembly 16.

A raised bubble 36 is formed in the flexible membrane and configured to envelope the key array 28. The bubble 36 is defined by a raised wall 38 which approximates the heights of the key side walls 32 and extends around an outer periphery of the key array 28 so as to encircle the key array 28. A generally planar cover 40 extends from the raised wall 38 of the bubble 36 and overlays the top surface 30 of the plurality of keys 26 comprising the key array 28. Thus, a single bubble 36 is formed which substantially envelopes the key array 28. The bubble 36 is positioned immediately adjacent to the side walls 32 of the peripheral keys 26 of the key array 28 so that the planar base 34 of the membrane substantially rests upon the deck portion 20 of the frame 18.

The shield 10 as described above protects the keyboard assembly 16 from water, dust and other contaminants while universally fitting over the key array 28 of any commercially available keyboard assembly 16.

With reference now to FIG. 2, the key array 28 can actually be divided into a number of key clusters. For example, a top row of keys 26 comprising the "escape", "functions 1–12", "print screen", "scroll", "pause break", and in certain models "number lock", "caps lock", and "scroll lock" are aligned with one another and form what is referred to collectively in this application as a function-key cluster 42. The spacing between the keys 26 of the function-key cluster 42 varies from keyboard assembly manufacturer, with some manufacturers including the number lock, caps lock or scroll lock keys, while others not including these raised keys.

All commercially available keyboard assemblies 16 also include a 10-key cluster 44 comprising a "numbers lock", "/", "*", "–", "7", "8", "9", "+", "4", "5", "6", "1", "2", "3", "0", ".", and "enter" keys 26.

All commercially available keyboard assemblies 16 also include what is referred to in this application as a cursor-key cluster 46 comprising the "insert", "home", "page up", "delete", "end", "page down", and directional arrow or cursor keys.

Each commercially available keyboard assembly 16 also includes what is referred to in this application as an alpha-numeric and format/command key cluster 48 comprising the alphabetical, numeric, punctuation and symbols (including "–", "_", "+", "=", "{", "[", "}", "]", ":", ";", """, "'", "<", ",", ">", ".", "?", "/"), "back space", "tab", "caps lock", "enter", "right and left shift", "control", "alt", "space bar" and "~/" keys. Different manufacturers may place additional keys within the alpha-numeric and format/command key cluster 48 which are specific in use to the keyboard assembly 16 and machine to which it is operably connected. These unique keys are typically placed on either side of the "space bar key". Thus, the "space bar key" can be of varying lengths depending upon the keyboard assembly 16 type.

With continuing reference to FIG. 2, a shield 12 embodying the present invention is shown which is similar to that described in FIG. 1, but having a plurality of key cluster bubbles 50, 52, 54, 56. A function-key cluster bubble 50 includes a raised wall 38 which encircles the function-key cluster 42 keys 26. A cover 40 extends from the raised wall 38 so that the bubble 50 envelopes the keys 26 of the function-key cluster 42. It will be noted that the function-key cluster bubble 50 extends across the entire length of the function-key cluster 42, whether there are any number, caps, or scroll lock keys or not so as to accommodate keyboard assemblies 16 having such raised keys. Similarly, a 10-key cluster bubble 52 envelopes the keys 26 of the 10-key cluster 44.

With reference to FIG. 4, raised walls 38 of the bubble 52 encircle the outer periphery of the 10-key cluster 44, and a cover 40 extends from the raised wall 38 so as to envelope the 10-key cluster keys 26. Likewise, a cursor-key cluster bubble 54, and alpha-numeric and format/command key cluster bubble 56 envelope the cursor-key cluster 46 and alpha-numeric and format/command key cluster 48, respectively. As shown in FIG. 4, the planar base 34 of the shield membrane overlays the deck portion 20 between the various key clusters 42–48. The planar base 34 also preferably extends over the frame sidewalls 22 for attachment to the obverse face 24 of the frame 18 with adhesive or double-sided tape 58 or other appropriate attachment means. However, the planar base 34 can extend only to the farthest edge of the desk 20 and be secured there or on the sidewalls 22.

Referring back to FIG. 3, the function-key cluster bubble 50 and alpha-numeric and format/command key cluster bubble 56 are shown with the shield membrane forming a "V" instead of lying substantially parallel to or on the deck 20 between these bubbles 50 and 56. This is due to the fact that there is a variable distance of a fraction of an inch between the function-key cluster 42 and the other key clusters 44–48 between makes and model of keyboard assemblies 16, necessitating the "V" configuration. The "V" configuration provides maximum width for bubbles 52–54 which permits optimal, lateral space to the left or right of the key clusters 44–46 covered by these bubbles.

It has also been found that there are slight variations in distance between the 10-key cluster 44 and cursor-key cluster 46 between the various brand names and models. Thus, as illustrated in FIG. 2, a similar "V" configuration in the shield 10 between the key clusters 44 and 46 can be utilized to accommodate for this variable distance. Alternatively, a single bubble 62 could envelop the keys 26 of both the 10-key cluster 44 and the cursor-key cluster 46 referred to herein as a combined 10-key and cursor-key cluster, as shown in FIG. 7.

Although the spacing between the cursor-key cluster 46 and the alpha-numeric and format/command key cluster 48 is fairly standard, such a "V" configuration could be formed between the bubbles 54–56 enveloping these key clusters 46–48 as well if found necessary.

With reference now to FIG. 5, yet another shield 14 embodying the present invention is illustrated, wherein the shield 14 includes function-key cluster bubble 50 overlying the function keys 42, and a single bubble 57 overlying the 10-key cluster 44, cursor-key cluster 46, and alpha-numeric and format/command key cluster 48. Grooves 60 are formed in the alphanumeric and format/command key cluster 48 so that the bubble 57 substantially surrounds and form-fits only to the alphabetical, numeric, and punctuation and symbol keys 26. The form-fitted keys comprise what is known in the art as the four alpha-numeric rows. That portion of the bubble 57 being grooved to form-fit the alpha-numeric keys is designated by the reference number 59 in FIGS. 5 and 6. Regardless of the keyboard assembly 16 type, the four rows of alpha-numeric keys are of the same size and configuration. Thus, no matter the model or brand of the computer keyboard, the alpha-numeric rows including the keys 26 illustrated can be substantially form-fitted within the bubble 57.

It will be noted that the "backspace" key, "~–", "enter", "tab", "shift", "Ctrl", "Alt", "space bar", and other formatting and command keys are not form-fitted as these keys vary in size, configuration, and placement between the various keyboard assemblies 16. Thus, the bubble 57 forms a uniform bubble having a generally planar cover 40 over the 10-key cluster keys 44, cursor-key cluster keys 46, and format and command keys of the alpha-numeric and format/command key cluster 48, with the alpha-numeric and punctuation keys being form-fitted. Of course, the bubble 57 could be altered so that not all of the alpha-numeric or punctuation keys are form-fitted. For example, the punctuation and symbol keys could underlie the generally planar cover 40 and not be form-fitted. However, it is preferable that the alpha-numeric and punctuation and symbol keys which are universally common between the various model and brand keyboard assemblies 16 be form-fitted so as to preserve their "touch" and "feel". Of course, the four alpha-numeric rows in any of the previously described and illustrated embodiments could be form-fitted as well while retaining the configuration of the bubble(s) 50–56.

Aside from providing a natural feel to the keystroke of each of these keys 26, these alpha-numeric and punctuation keys can be covered by the opaque, one-size-fits-all computer keyboard cover disclosed in U.S. Pat. No. 6,050,825 by Nichol et al., which facilitates memorization of these keys. Thus, this shield 14 when covered by the opaque cover of Nichols et al. can be used to facilitate memorization of the alphabetical, numerical, and punctuation keys, as well as providing a protective cover which can be used universally on all commercially available keyboard assemblies 16.

It will therefore be appreciated that the present invention provides a protective shield 10–14 for a keyboard assembly 16 which totally prevents contamination of the keyboard assembly 16 by completely encapsulating a top surface keyboard array 28 and deck 20. The present invention also permits the retention, to varying degrees, of the "touch" or "feel" of the individual keys 26 by the operator of the keyboard assembly 16. Of particular importance, the shields 10–14 of the present invention are configured such that they can be used on any commercially available keyboard assembly 16, eliminating the expensive requirement to manufacture and pre-order very specific keyboard covers according to model and brand type.

Ultimately, the invention could be manufactured as a disposable cover for use in hospitals, doctor and dentist offices. These could be manufactured very thin so as to become a single-use, disposable product. Such a cover would be particularly advantageous due to the concern for hazardous bio-waste which routinely contaminates keyboards in these settings. Additionally, the invention could be manufactured as an inexpensive, disposable cover for use in school classrooms, libraries, and offices in order to minimize the spread of contagious viruses and bacteria.

Although several embodiments have been described in detail for purposes of illustration, various modifications may be made to each without departing from the scope and spirit of the invention. Accordingly, the invention is not to be limited, except as by the appended claims.

What is claimed is:

1. A shield for protecting a keyboard assembly having a plurality of keys each having a top surface and side walls, the totality of the plurality of keys defining a key array having an outer periphery defined by side walls of outer keys of the array, the keys being grouped into a plurality of key clusters, and a deck portion surrounding each key cluster and the key array, the shield comprising:

a one-piece resiliently flexible membrane including a generally planar base configured to overlay the deck portion of the keyboard assembly, and a single raised bubble formed in the membrane and configured to envelop the entire key array, the bubble being defined by a raised wall approximating the height of the sidewalls of the keys defining the outer periphery of the key array and positionable adjacent to the sidewalls so as to encircle the outer periphery of the key array, and a cover extending from the raised wall and configured to overlay the top surface of the plurality of keys of the key array; and grooves formed in the raised bubble and configured to surround and form-fit no more than punctuation, symbol, alphabetical and numeric keys of an alpha-numeric and format/command key cluster of the key array;

whereby the shield is adapted for use on a keyboard assembly selected from numerous keyboard assemblies having different key configurations.

2. The shield of claim 1, wherein the membrane is transparent or translucent.

3. The shield of claim 1, wherein the membrane is opaque.

4. The shield of claim 1, wherein an outer edge of the base Includes attachment means for attaching the base to the deck portion of the keyboard assembly, sidewalls of the keyboard assembly or an obverse side of the keyboard assembly to hold the membrane in place.

5. A shield for protecting a keyboard assembly having a plurality of keys each having a top surface and side walls, the totality of keys defining a key array, the plurality of keys being grouped into a plurality of key clusters, including a function-key cluster, an alpha-numeric and format/command key cluster, a cursor-key duster and a 10-key cluster, each cluster having an outer periphery defined by sidewalls of outer keys of the cluster, the keyboard assembly having a deck portion surrounding each key cluster, the shield comprising:

a one-piece resiliently flexible membrane configured to overlay the entire key array and including a generally planar base configured to overlay the deck portion of the keyboard assembly;

wherein the membrane includes a first raised bubble configured to envelop the function-key cluster of keys; and wherein the membrane includes a second raised bubble configured to envelop the alpha-numeric and format/command key cluster of keys, cursor-key cluster of keys, and 10-key pad key cluster of keys;

whereby the shield is adapted for use on a keyboard assembly selected from numerous keyboard assemblies having different key configurations.

6. The shield of claim 5, wherein the second raised bubble includes grooves configured to surround and form-fit alphabetical keys of the alpha-numeric and format/command key cluster.

7. The shield of claim 6, wherein the second raised bubble further includes grooves configured to surround and form-fit punctuation and symbol keys of the alpha-numeric and format/command key cluster.

8. The shield of claim 6, wherein the second raised bubble further includes grooves configured to surround and form-fit numeric keys of the alpha-numeric and format/command key cluster.

9. The shield of claim 5, wherein an outer edge of the base includes attachment means for attaching the base to the deck portion of the keyboard assembly, sidewalls of the keyboard assembly or an obverse side of the keyboard assembly to hold the membrane in place.

10. The shield of claim 5, wherein the membrane is transparent or translucent.

11. The shield of claim 5, wherein the membrane is opaque.

12. A shield for protecting a keyboard assembly having a plurality of keys each having a top surface and side walls, the totality of keys defining a key array, the plurality of keys being grouped into a plurality of key clusters, including a function-key cluster, an alpha-numeric and format/command key cluster, a cursor-key cluster and a 10-key cluster, each cluster having an outer periphery defined by sidewalls of outer keys of the cluster, the keyboard assembly having a deck portion surrounding each key cluster, the shield comprising:

- a one-piece resiliently flexible membrane configured to overlay the entire key array and including a generally planar base configured to overlay the deck portion of the keyboard assembly;
- wherein the membrane includes a first raised bubble configured to envelop the function-key cluster of keys;
- wherein the membrane includes a second raised bubble configured to envelop the alpha-numeric and format/command key cluster of keys; and
- wherein the membrane includes a third raised bubble configured to envelop the cursor-key cluster of keys, and 10-key pad key cluster of keys;
- whereby the shield is adapted for use on a keyboard assembly selected from numerous keyboard assemblies having different key configurations.

13. The shield of claim 12, wherein the second raised bubble includes grooves configured to surround and form-fit alphabetical keys of the alpha-numeric and format/command key cluster.

14. The shield of claim 13, wherein the second raised bubble further includes grooves configured to surround and form-fit numeric keys of the alpha-numeric and format/command key cluster.

15. The shield of claim 14, wherein the second raised bubble includes grooves configured to surround and form-fit punctuation and symbol keys of the alpha-numeric and format/command key cluster.

16. The shield of claim 12, wherein the membrane is transparent or translucent.

17. The shield of claim 12, wherein the membrane is opaque.

18. The shield of claim 12, wherein an outer edge of the base includes attachment means for attaching the base to the deck portion of the keyboard assembly, sidewalls of the keyboard assembly or an obverse side of the keyboard assembly to hold the membrane in place.

* * * * *